(12) United States Patent
Huang et al.

(10) Patent No.: US 9,726,471 B1
(45) Date of Patent: Aug. 8, 2017

(54) POSITION SENSOR AND VARIABLE CAPACITOR ASSEMBLY THEREOF

(71) Applicant: TAIWAN ALPHA ELECTRONIC CO., LTD., Taoyuan, Taoyuan County (TW)

(72) Inventors: Tzu-Hsuan Huang, Taoyuan (TW); Wei-Liang Liu, Taoyuan (TW); Chao-Jen Ho, Taoyuan (TW); Chien-Chih Ho, Taoyuan (TW)

(73) Assignee: Taiwan Alpha Electronic Co., Ltd., Taoyuan (TW)

( * ) Notice: Subject to any disclaimer, the term of this patent is extended or adjusted under 35 U.S.C. 154(b) by 0 days.

(21) Appl. No.: 15/084,227

(22) Filed: Mar. 29, 2016

(30) Foreign Application Priority Data

Feb. 4, 2016  (TW) .............................. 105103757 A

(51) Int. Cl.
*G01B 7/14*    (2006.01)
(52) U.S. Cl.
CPC .................... *G01B 7/14* (2013.01)
(58) Field of Classification Search
CPC ... G06F 3/044; G06F 3/0414; G01R 27/2605; G01B 7/14
See application file for complete search history.

(56) References Cited

U.S. PATENT DOCUMENTS

| 2003/0133372 | A1* | 7/2003 | Fasen | G01D 5/2412 369/43 |
| 2012/0217171 | A1* | 8/2012 | Wurzinger | G01C 19/5776 205/775 |
| 2015/0145531 | A1* | 5/2015 | Lin | G01D 5/2415 324/662 |
| 2016/0247611 | A1* | 8/2016 | Huang | H01C 10/10 |

FOREIGN PATENT DOCUMENTS

| CN | 100425943 C | 10/2008 |
| TW | M509411 U | 9/2015 |
| WO | WO 2015/078378 A1 | 6/2015 |

* cited by examiner

*Primary Examiner* — Huy Q Phan
*Assistant Examiner* — Adam Clarke
(74) *Attorney, Agent, or Firm* — Muncy, Geissler, Olds & Lowe, P.C.

(57) ABSTRACT

A position sensor includes a variable capacitor assembly and a circuit board. The variable capacitor assembly includes a baseboard and a dielectric coupling element. The baseboard includes a baseboard body, a grounding electrode and two power electrodes. The grounding electrode is disposed nearby one side of the baseboard body. The two power electrodes are disposed separately near the other side of the baseboard body. The dielectric coupling element is spaced with the two power electrodes and the grounding electrode, and operable to be moved along a moving path. A covering condition is varied when the dielectric coupling element is operated to move along the moving path. When a power is alternatively applied to the power electrodes, a pair of capacitance values between the grounding electrode and the power electrodes is varied with the covering condition to accordingly determine a relative position of the coupling element along the moving path.

17 Claims, 12 Drawing Sheets

POSITION SENSOR AND VARIABLE CAPACITOR ASSEMBLY THEREOF

This application claims the benefit of Taiwan Patent Application Serial No. 105103757, filed Feb. 4, 2016, the subject matter of which is incorporated herein by reference.

BACKGROUND OF INVENTION

1. Field of the Invention

The invention relates to a position sensor and a variable capacitor assembly of the position sensor, and more particularly to the position sensor and the variable capacitor assembly that can realize changes of the area covered by the dielectric coupling element at two more electrode plates so as further to alter the fringing capacitance thereof.

2. Description of the Prior Art

Generally speaking, a conventional potentiometer applies mainly a variable resistor to detect a displacement. However, the service life of such a resistor-type potentiometer is usually reduced by the wear at the carbon of the resistor. Hence, another technique for detecting the displacement is to apply the capacitance effect.

Referring to FIG. 1, the capacitance effect between two electrode plates in the art is schematically shown. In an ordinary circuit layout, the capacitor is usually seen as one of basic electronic components. The capacitance effect of the capacitor is induced by the potential difference between the two electrode plates PA1 and PA2. When the two electrode plates PA1 and PA2 are parallel, a parallel capacitance field PEF would be formed between the two parallel electrode plates PA1 and PA2. Meanwhile, at the back and lateral sides of the two respective electrode plates PA1 and PA2, a fringing capacitance field FEF would be formed.

Referring to FIG. 2, a schematic view showing the work theory of a conventional area-varying capacitance sensor is provided. As shown, when the electrode plate PA1 maintains stationary and the electrode plate PA2 displaces horizontally along a parallel direction P1 with respect to the electrode plate PA1, then it is obvious that the covering area of the electrode plate PA2 upon the electrode plate PA1 would vary as well. Namely, the overlapping area of these two electrode plates PA1 and PA2 is varied according to the movement in between. Based on the relative movement, equally the change of the overlapping area, the parallel capacitance field PEF and the fringing capacitance field FEF induced by these two electrode plates PA1 and PA2 would vary as well.

Referring to FIG. 3, changes of the capacitance value with respect to the horizontal displacement for the conventional area-varying capacitance sensor of FIG. 2 are plotted. As shown, since an electric field would be induced by the potential difference between these two electrode plates, thus, in the art, a conductive metal such as a copper is usually applied as a material to produce the electrode plate. In considering the area-varying capacitance sensor, two copper electrode plates can be firstly at a separate state (displacement is 0%), then shift horizontally to become a state of completely overlapping (displacement is 50%), and shift horizontally further to become another separate state (displacement is 100%). The changes in the capacitance values between these two copper electrode plates are plotted in FIG. 3. as shown in FIG. 3, changes for these two conductive metal plates are not significant.

As described above, since relative movement between these two metallic electrode plates won't cause significant changes in the capacitance value, thus, by applying the technique of parallel capacitance effect to the displacement sensor, the sensitivity of the displacement detection via the change in capacitance is poor, and thus can't used as a tool to perform precise control.

SUMMARY OF THE INVENTION

In considering that the current capacitance sensor mainly applies the parallel capacitance effect to detect the displacement of the electrode plates, since the detection sensitivity of the area-varying capacitance sensor by applying the parallel capacitance effect is highly dependent on the capacitance and the length of the electrode plate, thus the increase upon the detection sensitivity can only be provided by increasing the length of the electrode plate. However, such a resort would change the size of the sensor as well, and thereby would affect the convenience of usage. Accordingly, to resolve the aforesaid shortcomings in the current area-varying capacitance sensor, it is the primary object of the present invention to provide a position sensor and a variable capacitor assembly that can apply a dielectric coupling element to cover or shield the electrodes. By varying the coverage rate upon the electrodes, the capacitance values can be altered, and further the displacement of the dielectric coupling element can be calculated.

In the present invention, the variable capacitor assembly is located inside a position sensor including a capacitance-detecting circuit for detecting a pair of alternative capacitance values of the variable capacitor assembly. The variable capacitor assembly includes a baseboard and a dielectric coupling element.

The baseboard includes a baseboard body, a grounding electrode and at least two power electrodes. The baseboard body extending in a longitudinal direction further includes an electrode layout surface. The grounding electrode for electrically coupling the capacitance-detecting circuit is located on the electrode layout surface and extends in the longitudinal direction. The at least two power electrodes are located linearly on one lateral side of the electrode layout surface by extending individually in the longitudinal direction while the grounding electrode is located on another lateral side thereof. The at least two power electrodes are alternatively connected with a power source of the capacitance-detecting circuit. The grounding electrode and each of the at least two power electrodes are spaced by a preset space in a width direction perpendicular to the longitudinal direction.

The dielectric coupling element has a dielectric constant and is located above the grounding electrode and the at least two power electrodes in a vertical direction perpendicular to the electrode layout surface. The dielectric coupling element is movable along a moving path parallel to the longitudinal direction.

In the present invention, each of the at least two power electrodes has an action surface of parallel capacitance effect facing the grounding electrode and another action surface of fringing capacitance effect facing the moving path, an area of the action surface of parallel capacitance effect is larger than that of the action surface of fringing capacitance effect, the dielectric constant is ranged between 10 and 50. While the dielectric coupling element displaces along the moving path, a position of the at least two power electrodes and the grounding electrode is covered by the dielectric coupling element. Also, the capacitance-detecting circuit detects changes of the pair of the alternative capacitance values as the covering position alters, and thus a relative position of the dielectric coupling element on the moving path is determined.

In one embodiment of the present invention, each of the at least two power electrodes is a rectangular plate structure.

In one embodiment of the present invention, the position sensor further includes a movable carrier, the movable carrier is separate from the grounding electrode and the at least two power electrodes in the vertical direction, and the movable carrier is to mount the dielectric coupling element and further has at least one control member for a user to displace the movable carrier along the moving path. The position sensor further includes a housing, and motion of the movable carrier is restrained by at least one track inside the housing.

In one embodiment of the present invention, the dielectric coupling element is a ceramic plate. Preferably, the ceramic plate is made of one of an Aluminum oxide, a Calcium oxide, a graphite, a superphosphate, a ferric oxide, a copper oxide, a tin oxide, a lead dioxide and a titanium oxide, a thickness of the ceramic plate is ranged between 0.5 mm and 1.2 mm, a length of the ceramic plate is ranged between 16 mm and 25 mm, a width of the ceramic plate is ranged between 10 mm and 15 mm, and a distance between the ceramic plate and a combination of the at least two power electrodes and the grounding electrode in the vertical direction is ranged between 0.1 mm and 0.5 mm.

In one embodiment of the present invention, the position sensor includes a variable capacitor assembly and a circuit board. The variable capacitor assembly further includes a baseboard and a dielectric coupling element. The baseboard includes a baseboard body, a grounding electrode and at least two power electrodes. The baseboard body extending in a longitudinal direction further includes an electrode layout surface. The grounding electrode for electrically coupling the capacitance-detecting circuit is located on the electrode layout surface and extends in the longitudinal direction. The at least two power electrodes are located linearly on one lateral side of the electrode layout surface by extending individually in the longitudinal direction while the grounding electrode is located on another lateral side thereof. The at least two power electrodes are alternatively connected with a power source of the capacitance-detecting circuit. The grounding electrode and each of the at least two power electrodes are spaced by a preset space in a width direction perpendicular to the longitudinal direction.

The dielectric coupling element has a dielectric constant and is located above the grounding electrode and the at least two power electrodes in a vertical direction perpendicular to the electrode layout surface. The dielectric coupling element is movable along a moving path parallel to the longitudinal direction.

The circuit board includes a capacitance-detecting circuit electrically coupling the grounding electrode and the at least two power electrodes, and is to detect a pair of alternative capacitance values of the variable capacitor assembly.

In the present invention, each of the at least two power electrodes has an action surface of parallel capacitance effect facing the grounding electrode and another action surface of fringing capacitance effect facing the moving path, an area of the action surface of parallel capacitance effect is larger than that of the action surface of fringing capacitance effect, the dielectric constant is ranged between 10 and 50. While the dielectric coupling element displaces along the moving path, a position of the at least two power electrodes and the grounding electrode is covered by the dielectric coupling element. Also, the capacitance-detecting circuit detects changes of the pair of the alternative capacitance values as the covering position alters, and thus a relative position of the dielectric coupling element on the moving path is determined.

In one embodiment of the present invention, the at least two power electrodes 為 a rectangular plate structure.

In one embodiment of the present invention, the position sensor further includes a movable carrier, the movable carrier is separate from the grounding electrode and the at least two power electrodes in the vertical direction, and the movable carrier is to mount the dielectric coupling element and further has at least one control member for a user to displace the movable carrier along the moving path. The position sensor further includes a housing, and motion of the movable carrier is restrained by at least one track inside the housing.

In one embodiment of the present invention, the dielectric coupling element is a ceramic plate. Preferably, the ceramic plate is made of one of an Aluminum oxide, a Calcium oxide, a graphite, a superphosphate, a ferric oxide, a copper oxide, a tin oxide, a lead dioxide and a titanium oxide, a thickness of the ceramic plate is ranged between 0.5 mm and 1.2 mm, a length of the ceramic plate is ranged between 16 mm and 25 mm, a width of the ceramic plate is ranged between 10 mm and 15 mm, and a distance between the ceramic plate and a combination of the at least two power electrodes and the grounding electrode in the vertical direction is ranged between 0.1 mm and 0.5 mm.

In one embodiment of the present invention, the baseboard and the circuit board is integrated into a unique circuit board.

As described above, by comparing to the prior art that the conventional area-varying capacitance sensor mainly apply the parallel capacitance effect to derive the displacement of the electrode plate, the present invention applies the dielectric coupling element to alter the coverage rate upon the power electrodes and the grounding electrode, so as further to vary the capacitance values between each of the power electrodes and the grounding electrode, such that the position change of the dielectric coupling element can be calculated by evaluating the changes in the capacitance values.

All these objects are achieved by the position sensor and the variable capacitor assembly thereof described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a position sensor and a variable capacitor assembly of the position sensor. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
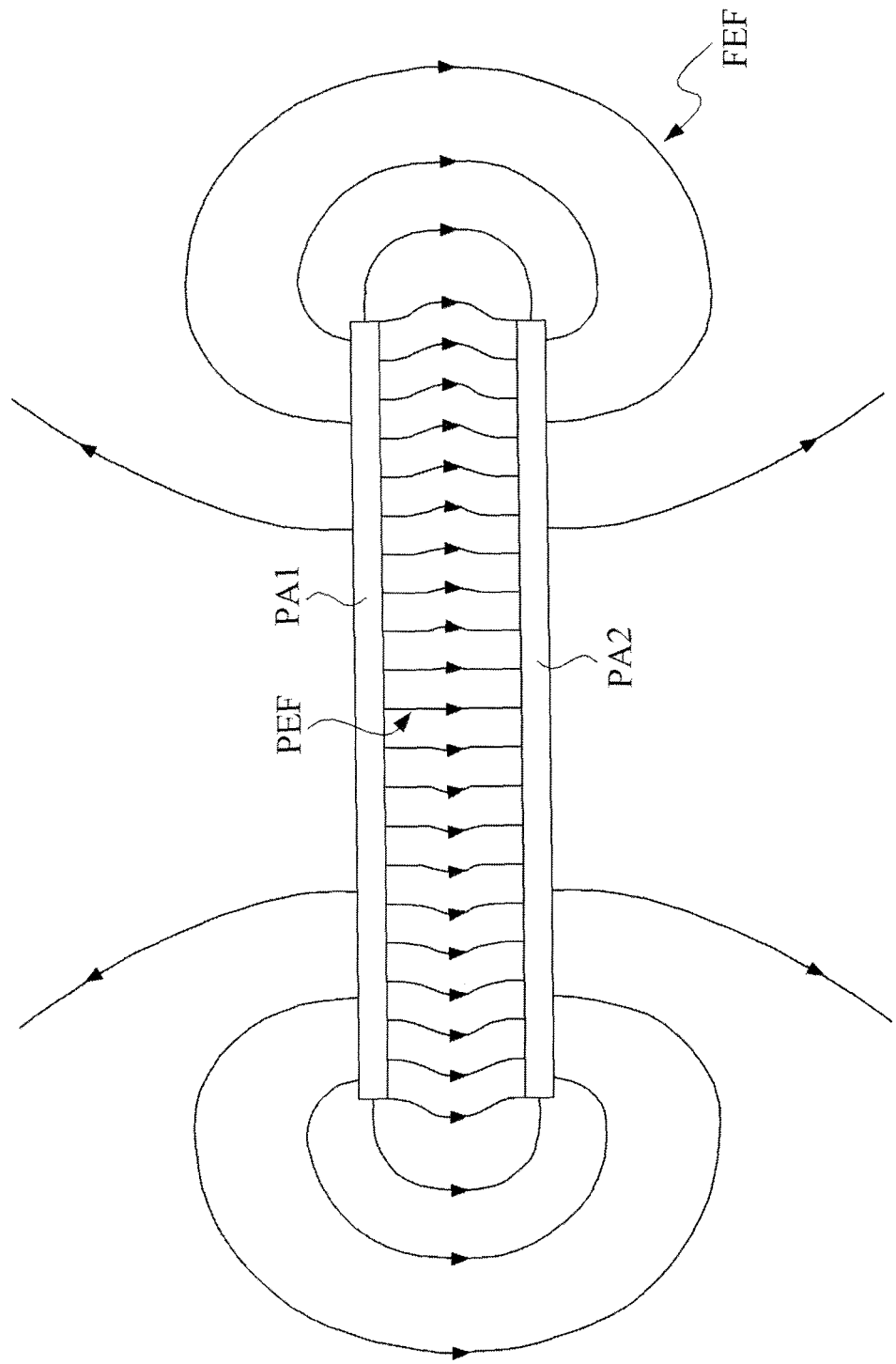
FIG. 1 demonstrates schematically the capacitance effect between two electrode plates in the art.
Figure 2:
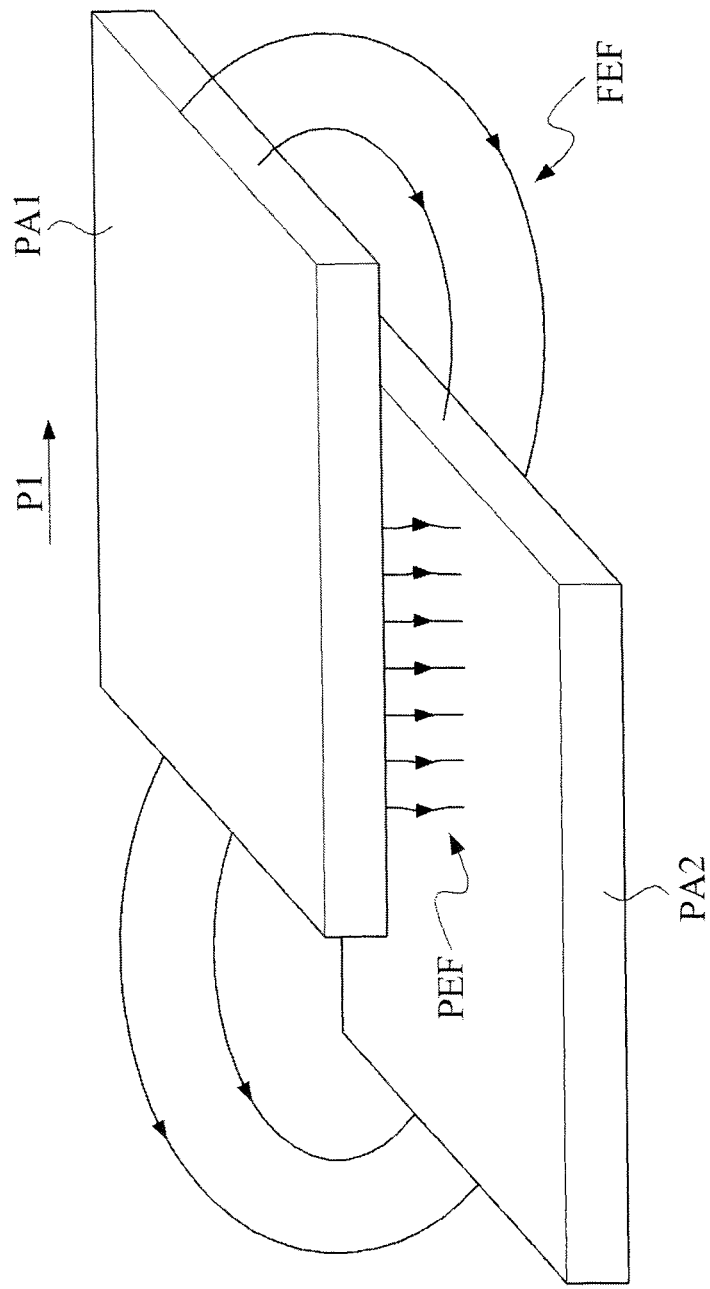
FIG. 2 is a schematic view showing the work theory of a conventional area-varying capacitance sensor.
Figure 3:
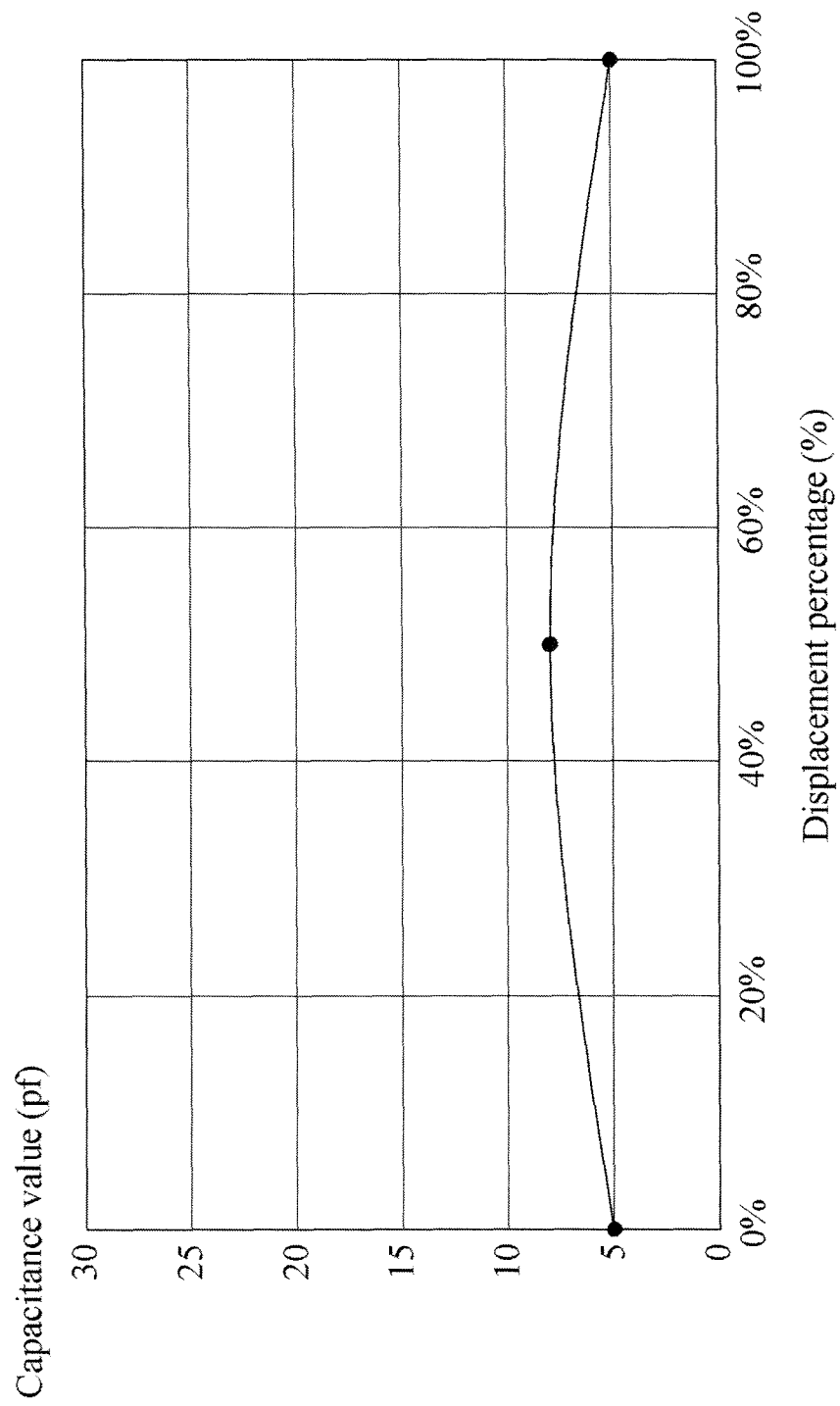
FIG. 3 shows changes of the capacitance value with respect to the horizontal displacement for the conventional area-varying capacitance sensor of FIG. 2.
Figure 4:
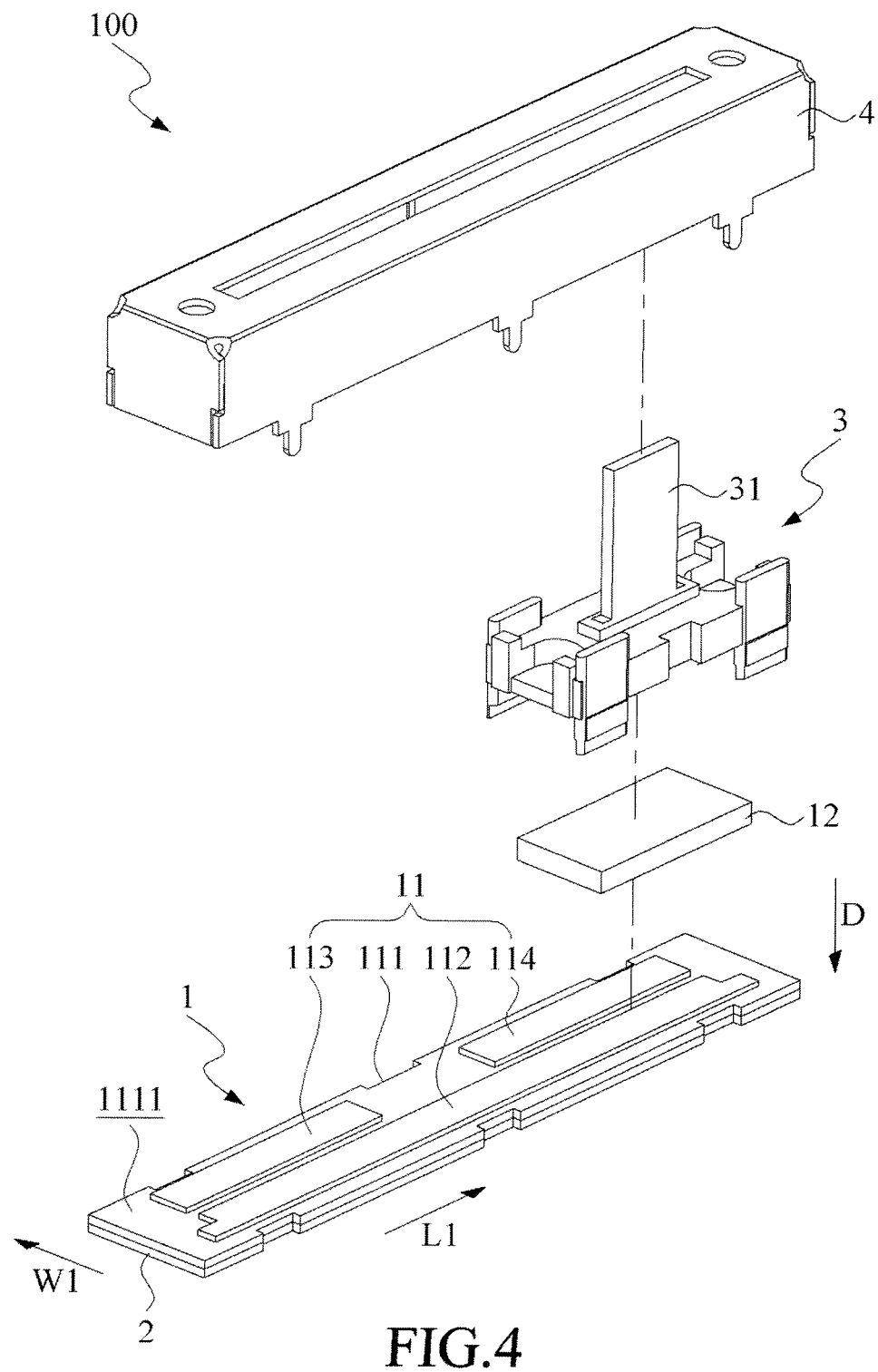
FIG. 4 is an exploded view of a preferred embodiment of the position sensor in accordance with the present invention.
Figure 5:
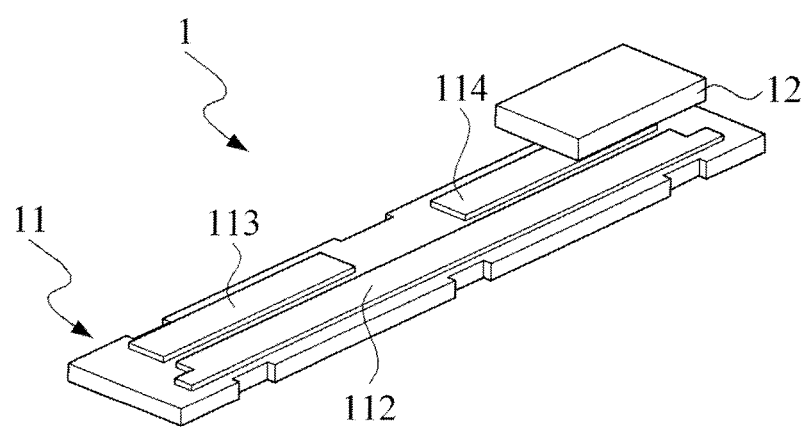
FIG. 5 is an exploded view of the variable capacitor assembly of FIG. 4.
Figure 6:
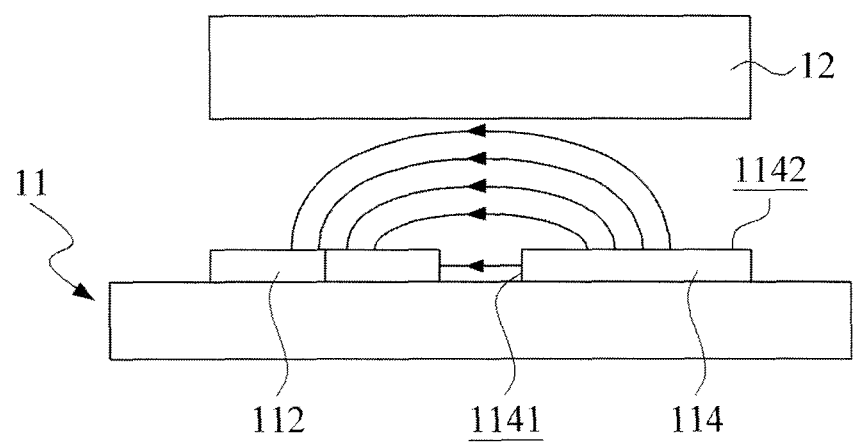
FIG. 6 is a lateral side view of FIG. 5.
Figure 7:
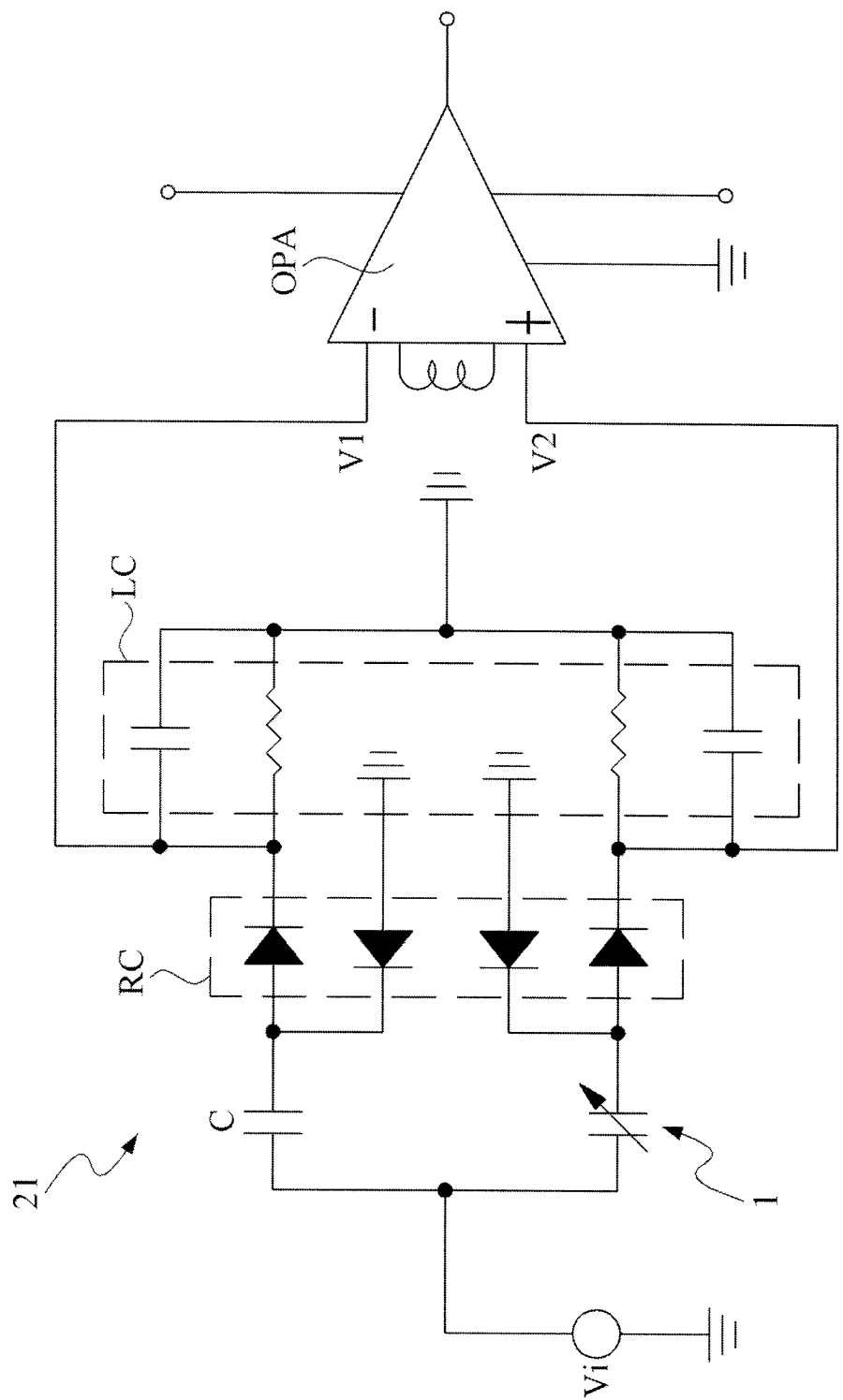
FIG. 7 shows schematically the capacitance-detecting circuit for the position sensor of FIG. 4.

Refer now to FIG. 4 through FIG. 7; where FIG. 4 is an exploded view of a preferred embodiment of the position sensor in accordance with the present invention; FIG. 5 is an exploded view of the variable capacitor assembly of FIG. 4; FIG. 6 is a lateral side view of FIG. 5; and, FIG. 7 shows schematically the capacitance-detecting circuit for the position sensor of FIG. 4.

As shown, the position sensor 100 includes a variable capacitor assembly 1, a circuit board 2, a movable carrier 3 and a housing 4.

The variable capacitor assembly 1 includes a baseboard 11 and a dielectric coupling element 12. The baseboard 11 further includes a baseboard body 111, a grounding electrode 112 and two power electrodes 113 and 114.

The baseboard body 111 extending in a longitudinal direction L1 has an electrode layout surface 1111. The grounding electrode 112 located on the electrode layout surface 1111 is extended in the longitudinal direction L1. The two power electrodes 113 and 114 both located linearly on the same lateral side of the electrode layout surface 1111 are extended individually in the longitudinal direction L1 by spaced a predetermined distance. The grounding electrode 112 located on another lateral side of the electrode layout surface 1111 is extended in the longitudinal direction L1. The grounding electrode 112 and each of the two power electrodes 113 and 114 are spaced by a preset space in a width direction W1 perpendicular to the longitudinal direction L1. The two power electrodes 113 and 114 are alternatively connected with a power source (not shown in the figure). Here, the term "alternatively" indicates that connection of the power source to the two power electrodes 113 and 114 is switch-able around the power electrode 113 and the power electrode 114.

The dielectric coupling element 12 with a dielectric constant K is located above, in a vertical direction D, the grounding electrode 112 and the two power electrodes 113 and 114 on the electrode layout surface 1111. The dielectric coupling element 12 is movable along a moving path P parallel to the longitudinal direction L1. In this embodiment, the dielectric coupling element 12 can be a ceramic plate made of one of an Aluminum oxide, a Calcium oxide, a graphite, a superphosphate, a ferric oxide, a copper oxide, a tin oxide, a lead dioxide and a titanium oxide. In addition, the thickness of the ceramic plate is ranged between 0.5 mm and 1.2 mm, the length of the ceramic plate is ranged between 16 mm and 25 mm, and the width of the ceramic plate is ranged between 10 mm and 15 mm. The distance between the ceramic plate and each of the two power electrodes 113 and 114 and the grounding electrode 112 are ranged between 0.1 mm and 0.5 mm in the vertical direction D.

The circuit board 2 is located on a surface of the baseboard 11 opposing to the electrode layout surface 1111, and includes thereon a capacitance-detecting circuit 21. The capacitance-detecting circuit 21 is electrically connected with the grounding electrode 112 and the two power electrodes 113 and 114, such that the aforesaid power source (Vi in the figure) can alternatively connect with the power electrodes 113 and 114 of the variable capacitor assembly 1 and thus a pair of alternative capacitance values of the variable capacitor assembly 1 can be detected. In this embodiment, the capacitance-detecting circuit 21 is consisted of a reference capacitance C, an AC/DC circuit RC, a filter circuit LC and a comparator OPA. The capacitance-detecting circuit 21 uses the reference capacitance C and a pair of the alternative capacitance values detected by the variable capacitor assembly 1 to produce two voltages V1 and V2 by the AC/DC circuit RC and the filter circuit LC. Further, these two voltages V1 and V2 are compared by the comparator OPA so as to deduce the relationship of these two capacitance values.

In this embodiment, the capacitance-detecting circuit 21 can be constructed at the back side of the circuit board 2, opposing to the side thereof contacting the baseboard 11. The capacitance-detecting circuit 21 can electrically couple the grounding electrode 112 and the two power electrodes 113 and 114 through external or internal wiring. However, since the means of electrically coupling the capacitance-detecting circuit 21, the grounding electrode 112 and the two power electrodes 113 and 114 is ordinary in the art, and thus details thereabout would be omitted herein. In addition, in this embodiment, the baseboard 11 and the circuit board 2 can be integrated as a unique circuit board.

The movable carrier 3 is mounted in the vertical direction D by spacing the grounding electrode 112 and the two power electrodes 113 and 114 so as to locate the dielectric coupling element 12 in between. The movable carrier 3 further has a control member 31 for the user to move the movable carrier 3 along the moving path P and further to drive the dielectric coupling element 12 to displace along the moving path P. In this embodiment, the movable carrier 3 can further include four supports (not shown in the figure) to separate the movable carrier 3 and the baseboard 11 and to thus generate a room for mounting the dielectric coupling element 12 in between with the combination of the grounding electrode 112 and the two power electrodes 113 and 114 in the vertical direction D.

The housing 4 is fixed onto the baseboard 11, so that movement of the movable carrier 3 in the longitudinal direction L1 is restrained inside the housing 4. In this embodiment, the movable carrier 3 can move along an internal track (not shown in the figure) of the housing 4 in the longitudinal direction L1, or can be restrained by the room formed between the housing 4 and the baseboard 11. More evenly, in the housing 4, at least one guide pillar extending in the longitudinal direction L1 can be used to penetrate the movable carrier 3 for restraining the movable carrier 3 to displace in the longitudinal direction L1 between the housing 4 and the baseboard 11.

As shown in FIG. 4 through FIG. 6, by having the power electrode 114 as a typical example, the power electrode 114 has an action surface 1141 of parallel capacitance effect facing the grounding electrode 112, and another action surface 1142 of fringing capacitance effect facing the moving path (not shown in the figure, but located substantially at the position around the dielectric coupling element 12). The area of the action surface 1141 of parallel capacitance effect is greater than that of the action surface 1142 of fringing capacitance effect. The dielectric constant K of the power electrode 114 is ranged between 10 and 50. Upon alternatively coupling the power source with the power electrodes 113 and 114, when the dielectric coupling element 12 displaces along the moving path, the covering position of the dielectric coupling element 12 over the two power electrodes 113 and 114 and the grounding electrode 112 is altered, such that the capacitance-detecting circuit 21 can detect changes of the pair of the alternative capacitance values accounted for the changes in the covering position. Upon such an arrangement, the relative position of the dielectric coupling element 12 in the moving path can be realized.

Figure 8A:
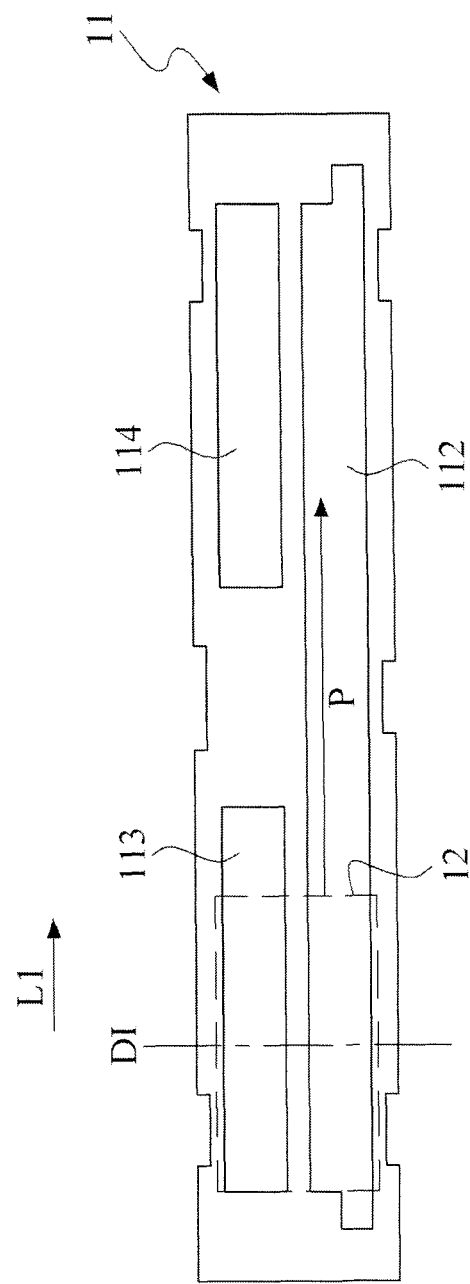
FIG. 8A shows schematically a view of the variable capacitor assembly of FIG. 5, with the dielectric coupling element located at an initial position.
Figure 8B:
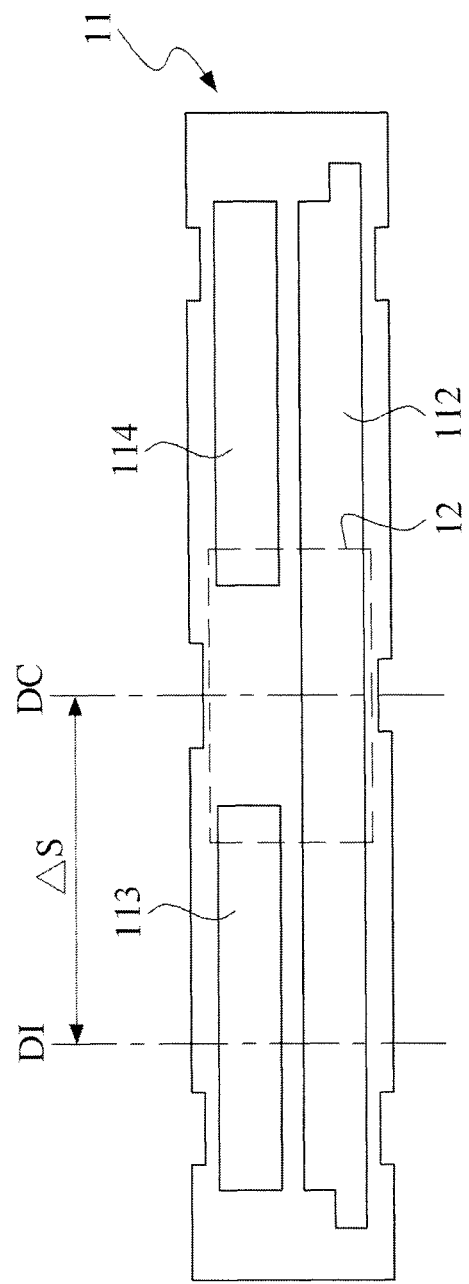
FIG. 8B shows schematically a view of the variable capacitor assembly of FIG. 5, with the dielectric coupling element located at a center position.
Figure 8C:
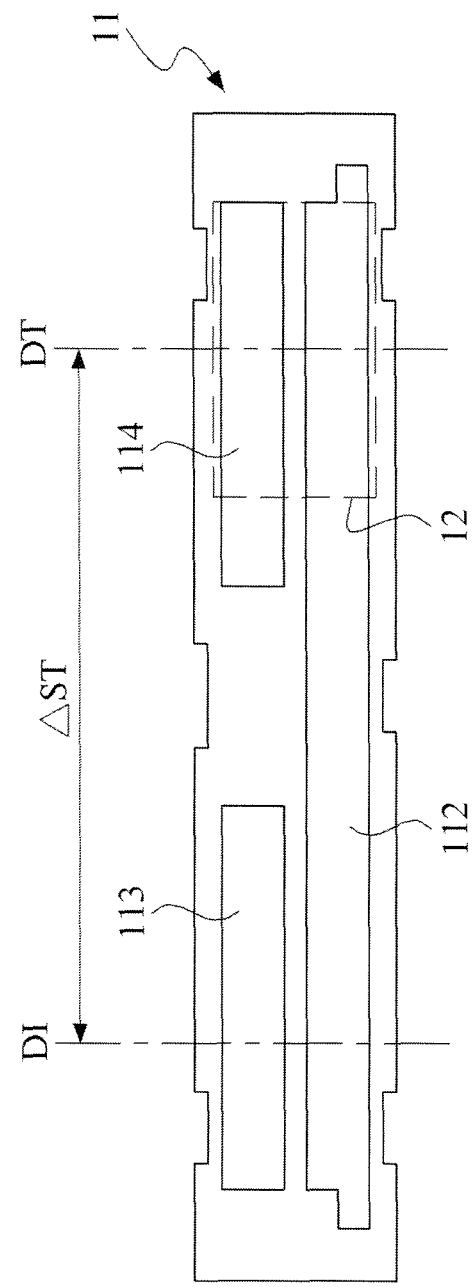
FIG. 8C shows schematically a view of the variable capacitor assembly of FIG. 5, with the dielectric coupling element located at a terminal position.
Figure 9:
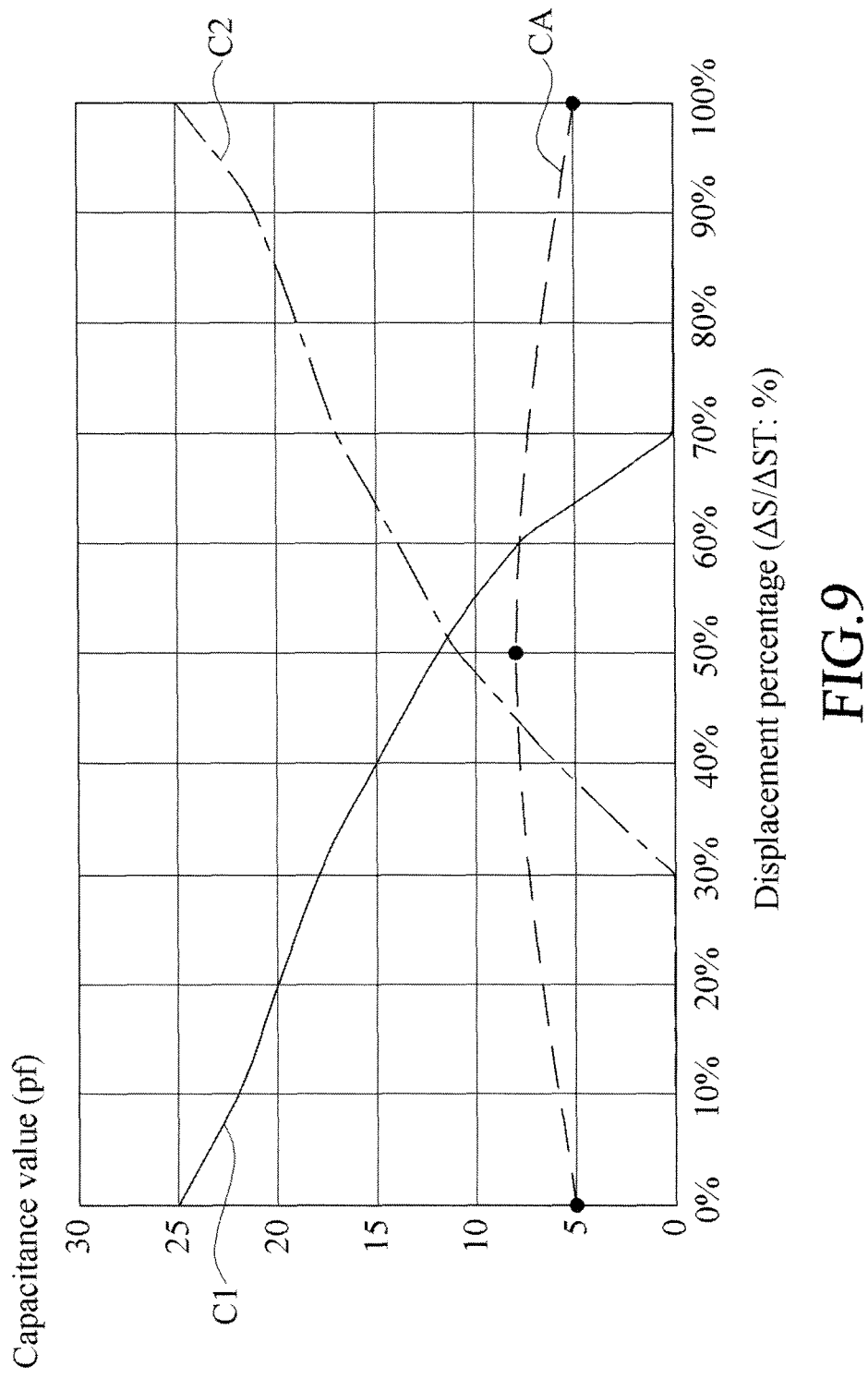
FIG. 9 shows relationship of a pair of alternative capacitance values with respect to the displacement percentage for the duration of the dielectric coupling element moving from the initial position to the terminal position along a moving path.

Refer now to FIGS. 8A-8C and FIG. 9; where FIG. 8A shows schematically a view of the variable capacitor assembly of FIG. 5, with the dielectric coupling element located at an initial position; FIG. 8B shows schematically a view of the variable capacitor assembly of FIG. 5, with the dielectric coupling element located at a center position; FIG. 8C shows schematically a view of the variable capacitor assembly of FIG. 5, with the dielectric coupling element located at a terminal position; and, FIG. 9 shows relationship of a pair of alternative capacitance values with respect to the displacement percentage for the duration of the dielectric coupling element moving from the initial position to the terminal position along the moving path. As shown, while the aforesaid power source connects with the power electrode 113, the relationship between the detected capacitance value and the displacement percentage is shown by a first curve C1 in FIG. 9. On the other hand, while the aforesaid power source connects with the power electrode 114, the relationship between the detected capacitance value and the displacement percentage is shown by a second curve C2. As shown in FIG. 9, each of the displacement percentage is to read a first capacitance value on the first curve C1 and a second capacitance value on the second curve C2. This pair of the alternative capacitance values is namely the first capacitance value and the second capacitance value. As described above, while the dielectric coupling element 12 is operated to displace to any position on the moving path P, a corresponding pair of the alternative capacitance values can be alternatively detected to include the first capacitance value and the second capacitance value. By analyzing the first capacitance value and the second capacitance value, the relative position of the dielectric coupling element 12 on the moving path P can be determined.

When the dielectric coupling element 12 is displaced from an initial position DI to a center position DC along the moving path P, the covering area of the dielectric coupling element 12 upon the power electrode 113 would decrease, while the covering area of the dielectric coupling element 12 upon the power electrode 114 would increase. As the dielectric coupling element 12 keeps moving along the moving path P to a terminal position DT, from the first curve C1 and the second curve C2 in FIG. 9, it is understood that the covering area of the dielectric coupling element 12 upon the power electrode 113 would be decreased to a minimum, evenly to a state of no coverage at all. At the same time, the covering area of the dielectric coupling element 12 upon the power electrode 114 would be increased to a maximum, evenly to a state of fully coverage. The displacement percentage in FIG. 9 is calculated by dividing the distance ΔS (the distance measured from the initial position DI of the dielectric coupling element 12 to the instant position thereof on the moving path P) by the total distance ΔST (the distance between the initial position DI of the dielectric coupling element 12 and the terminal position DT thereof on the moving path P). The capacitance values can thus be detected by the capacitance-detecting circuit 21 through the power electrodes 113 and 114 so as to plot the curve C1 for the power electrode 113 and the curve C2 for the power electrode 114. In addition, the curve CA stands for the relationship of the capacitance values for the relative moment between the aforesaid two conventional metallic electrode plates.

As described above, by comparing to the prior art that uses the parallel capacitance effect between the two metallic electrode plates to determine the coverage area in between, since the dielectric coupling element 12 with a dielectric constant K ranging between 10 and 50 is applied to cover the electric field generated due to the fringing capacitance effect among the grounding electrode 112 and the two power electrodes 113 and 114, so as further to realize the corresponding capacitance values altered by the instant fringing capacitance effect among the grounding electrode 112 and the two power electrodes 113 and 114. Thus, the displacement percentage of the dielectric coupling element 12 can be determined by judging the change in the capacitance values.

In addition, since the present invention applies the dielectric coupling element 12 to cover the electric field between the power electrode 113 and the grounding electrode 112 and also to cover the electric field between the power electrode 114 and the grounding electrode 112, thus while the dielectric coupling element 12 is displaced along the moving path P above and from the power electrode 113 to the power electrode 114, the capacitance-detecting circuit 21 can detect the changes of the curves C1 and C2 corresponding to the capacitance values of the respective power electrode 113 and 114, such that the moving direction and the relative position of the dielectric coupling element 12 can be determined by judging the trends of the curves C1 and C2.

Figure 10:
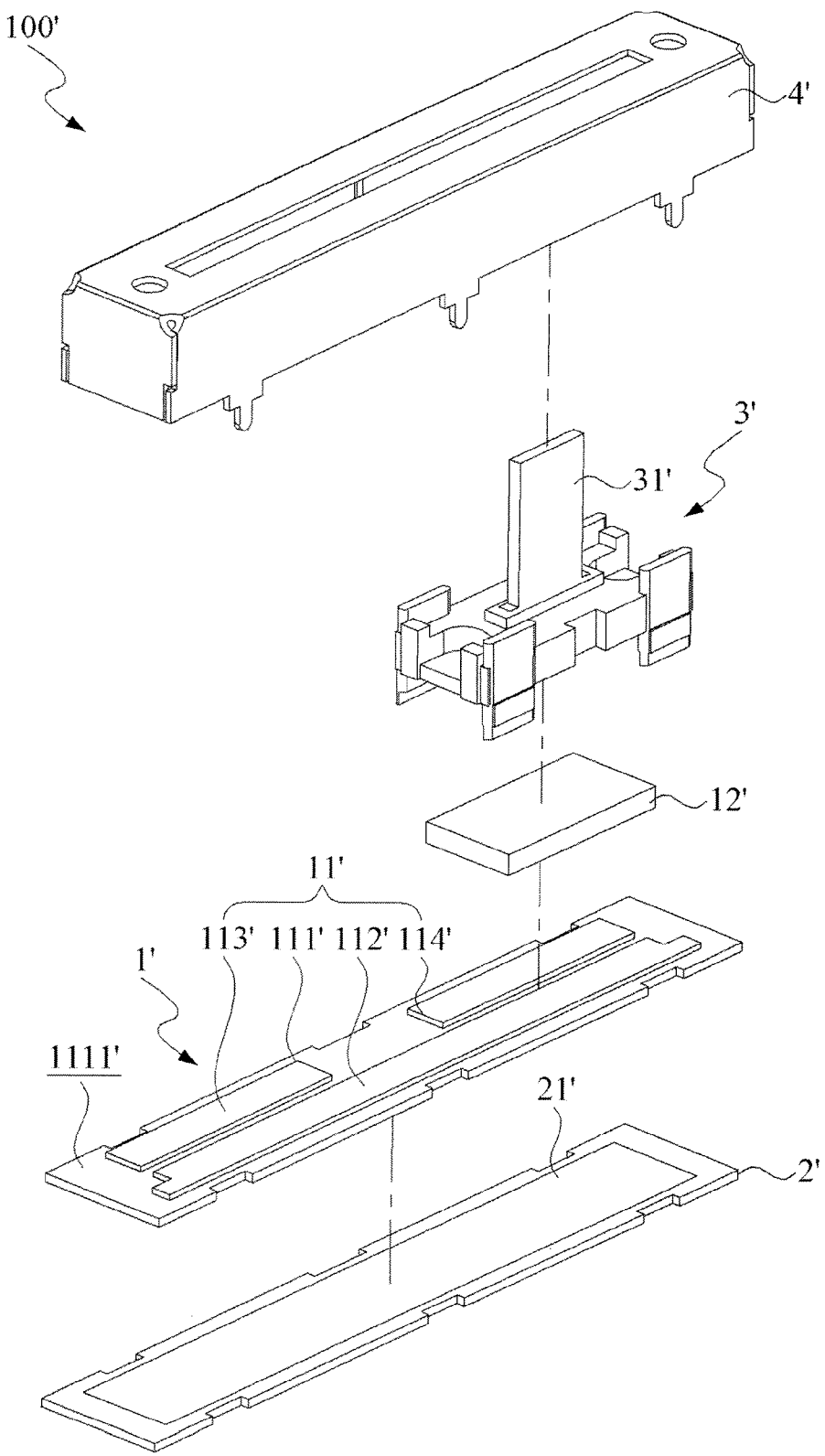
FIG. 10 is an exploded view of another embodiment of the position sensor in accordance with the present invention.

Referring now to FIG. 10, an exploded view of another embodiment of the position sensor in accordance with the present invention is present. As shown, the position sensor 100' includes a variable capacitor assembly 1', a circuit board 2', a movable carrier 3' and a housing 4'.

The variable capacitor assembly 1' includes a baseboard 11' and a dielectric coupling element 12'. The baseboard 11' further includes a baseboard body 111', a grounding electrode 112' and two power electrodes 113' and 114'. The position sensor 100' in this embodiment is similar to the aforesaid position sensor 100. Similarly, the baseboard body 111' has an electrode layout surface 1111', the grounding electrode 112' and the two power electrodes 113' and 114' are all mounted on the electrode layout surface 1111', the dielectric coupling element 12' is mounted to separate the movable carrier 3' and the combination of the grounding electrode 112' and the two power electrodes 113' and 114', and the housing 4' is fixed above the baseboard 11'. The major difference between these two embodiments is that the circuit board 2' of this embodiment is located at a bottom side of the baseboard 11' by opposing to the electrode layout surface 1111' and a capacitance-detecting circuit 21' for coupling electrically the grounding electrode 112' and the two power electrodes 113' and 114' is on the top surface of the circuit board 2'.

In summary, by comparing to the prior art that uses the parallel capacitance effect between the two metallic electrode plates to determine the coverage area in between, since the dielectric coupling element with a dielectric constant K ranging between 10 and 50 is applied to cover the electric field generated due to the fringing capacitance effect among the grounding electrode and the two power electrodes, so as further to realize the corresponding capacitance values altered by the instant fringing capacitance effect among the grounding electrode and the two power electrodes. Thus, the displacement percentage of the dielectric coupling element can be determined by judging the change in the capacitance values. Upon such an arrangement, the sensitivity in detecting the capacitance values can be enhanced, and also the non-contact detection provided by the present invention can substantially increase the service life of the position sensor.

While the present invention has been particularly shown and described with reference to a preferred embodiment, it will be understood by those skilled in the art that various changes in form and detail may be without departing from the spirit and scope of the present invention.

What is claimed is:

1. A variable capacitor assembly, located inside a position sensor, the position sensor including a capacitance-detecting circuit for detecting a pair of alternative capacitance values of the variable capacitor assembly, the variable capacitor assembly comprising:
    a baseboard, further including:
        a baseboard body, extending in a longitudinal direction, further including an electrode layout surface;
        a grounding electrode for electrically coupling the capacitance-detecting circuit, located on the electrode layout surface, extending in the longitudinal direction; and
        at least two power electrodes, located linearly on one lateral side of the electrode layout surface by extending individually in the longitudinal direction while the grounding electrode is located on another lateral side thereof, being alternatively connected with a power source of the capacitance-detecting circuit, the grounding electrode and each of the at least two power electrodes being spaced by a preset space in a width direction perpendicular to the longitudinal direction; and
    a dielectric coupling element, having a dielectric constant, located above the grounding electrode and the at least two power electrodes in a vertical direction perpendicular to the electrode layout surface, being movable along a moving path parallel to the longitudinal direction;
    wherein each of the at least two power electrodes has an action surface of parallel capacitance effect facing the grounding electrode and another action surface of fringing capacitance effect facing the moving path, an area of the action surface of parallel capacitance effect is larger than that of the action surface of fringing capacitance effect, the dielectric constant is ranged between 10 and 50;
    wherein, while the dielectric coupling element displaces along the moving path, a position of the at least two power electrodes and the grounding electrode is covered by the dielectric coupling element;
    wherein the capacitance-detecting circuit detects changes of the pair of the alternative capacitance values as the covering position alters, and thus a relative position of the dielectric coupling element on the moving path is determined.

2. The variable capacitor assembly of claim 1, wherein each of the at least two power electrodes is a rectangular plate structure.

3. The variable capacitor assembly of claim 1, wherein the position sensor further includes a movable carrier, the movable carrier is separate from the grounding electrode and the at least two power electrodes in the vertical direction, and the movable carrier is to mount the dielectric coupling element and further has at least one control member for a user to displace the movable carrier along the moving path.

4. The variable capacitor assembly of claim 3, wherein the position sensor further includes a housing, and motion of the movable carrier is restrained by at least one track inside the housing.

5. The variable capacitor assembly of claim 1, wherein the dielectric coupling element is a ceramic plate.

6. The variable capacitor assembly of claim 5, wherein the ceramic plate is made of one of an Aluminum oxide, a Calcium oxide, a graphite, a superphosphate, a ferric oxide, a copper oxide, a tin oxide, a lead dioxide and a titanium oxide.

7. The variable capacitor assembly of claim 5, wherein a thickness of the ceramic plate is ranged between 0.5 mm and 1.2 mm, a length of the ceramic plate is ranged between 16 mm and 25 mm, and a width of the ceramic plate is ranged between 10 mm and 15 mm.

8. The variable capacitor assembly of claim 5, wherein a distance between the ceramic plate and a combination of the at least two power electrodes and the grounding electrode in the vertical direction is ranged between 0.1 mm and 0.5 mm.

9. A position sensor, comprising:
    a variable capacitor assembly, further comprising:
        a baseboard, further including:
            a baseboard body, extending in a longitudinal direction, further including an electrode layout surface;
            a grounding electrode for electrically coupling the capacitance-detecting circuit, located on the electrode layout surface, extending in the longitudinal direction; and
            at least two power electrodes, located linearly on one lateral side of the electrode layout surface by extending individually in the longitudinal direction while the grounding electrode is located on another lateral side thereof, being alternatively connected with a power source of the capacitance-detecting circuit, the grounding electrode and each of the at least two power electrodes being spaced by a preset space in a width direction perpendicular to the longitudinal direction; and
        a dielectric coupling element, having a dielectric constant, located above the grounding electrode and the at least two power electrodes in a vertical direction perpendicular to the electrode layout surface, being movable along a moving path parallel to the longitudinal direction; and
    a circuit board, including a capacitance-detecting circuit electrically coupling the grounding electrode and the at least two power electrodes, being to detect a pair of alternative capacitance values of the variable capacitor assembly;
    wherein each of the at least two power electrodes has an action surface of parallel capacitance effect facing the grounding electrode and another action surface of fringing capacitance effect facing the moving path, an area of the action surface of parallel capacitance effect is larger than that of the action surface of fringing capacitance effect, the dielectric constant is ranged between 10 and 50;

wherein, while the dielectric coupling element displaces along the moving path, a position of the at least two power electrodes and the grounding electrode is covered by the dielectric coupling element;

wherein the capacitance-detecting circuit detects changes of the pair of the alternative capacitance values as the covering position alters, and thus a relative position of the dielectric coupling element on the moving path is determined.

10. The position sensor of claim 9, wherein each of the at least two power electrodes is a rectangular plate structure.

11. The position sensor of claim 9, further including a movable carrier separated from the grounding electrode and the at least two power electrodes in the vertical direction, the movable carrier being to mount the dielectric coupling element and further has at least one control member for a user to displace the movable carrier along the moving path.

12. The position sensor of claim 11, further including a housing, motion of the movable carrier being restrained by at least one track inside the housing.

13. The position sensor of claim 9, wherein the dielectric coupling element is a ceramic plate.

14. The position sensor of claim 13, wherein the ceramic plate is made of one of an Aluminum oxide, a Calcium oxide, a graphite, a superphosphate, a ferric oxide, a copper oxide, a tin oxide, a lead dioxide and a titanium oxide.

15. The position sensor of claim 13, wherein a thickness of the ceramic plate is ranged between 0.5 mm and 1.2 mm, a length of the ceramic plate is ranged between 16 mm and 25 mm, and a width of the ceramic plate is ranged between 10 mm and 15 mm.

16. The position sensor of claim 13, wherein a distance between the ceramic plate and a combination of the at least two power electrodes and the grounding electrode in the vertical direction is ranged between 0.1 mm and 0.5 mm.

17. The position sensor of claim 9, wherein the baseboard and the circuit board are integrated into a unique circuit board.

* * * * *